United States Patent [19]
Yu

[11] Patent Number: 5,778,113
[45] Date of Patent: Jul. 7, 1998

[54] CONFIGURABLE CHIRP MACH-ZEHNDER OPTICAL MODULATOR

[75] Inventor: Jun Yu, Stittsville, Canada

[73] Assignee: Northern Telecom Limited, Montreal, Canada

[21] Appl. No.: 745,168

[22] Filed: Nov. 7, 1996

[51] Int. Cl.$^6$ .................................................. G02B 6/10
[52] U.S. Cl. ........................................ 385/3; 385/8; 385/9
[58] Field of Search ................................. 385/2, 3, 8, 9

[56] References Cited

PUBLICATIONS

"10Gb/s, 120 km Normal Fiber Transmission Experiment using a 1.56 um Multiple Quantum Well InP/InGaAsP Mach–Zehnder Modulator", Rolland et al, Conf. Optical Fiber Communication, San Jose, California, 1993, pp. 111–114.

"High–Speed, Low Power Optical Modulator with Adjustable Chirp Parameter", Korotky et al, Topical Meeting of Integrated Photonics Research, Moneterey, California, 1991, pp. 53–54.

"Dispersion Penalty Reduction Using an Optical Modulator with Adjustable Chirp", Gnauck et al, IEEE Photonics Technology Letters, vol. 3, No. 10, Oct. 1991, pp. 916–918.

"10Gb/s, 120 km Normal Fiber Transmission Experiment using a 1.56 um Multiple Quantum Well InP/InGaAsP Mach–Zehnder", Rolland et al, Conf. Optical Fiber Communication, San Jose, California, 1993, pp. 1111–1143

*Primary Examiner*—John Ngo
*Attorney, Agent, or Firm*—George MacGregor

[57] ABSTRACT

A multi-quantum-well Mach-Zehnder optical phase modulator selectively generates positive and negative frequency chirp. The modulator has an asymmetric input y-junction coupler and an asymmetric output y-junction coupler joined by interferometric arms defining two optical paths of unequal length so as to generate a fixed phase difference of $\pi$ or an integral odd multiple thereof. The modulator has electrodes on each arm for receiving modulating electric fields in a push-pull relationship. A control electrode is provided on one of the arms for receiving a control electric field. The modulator, when driven without any control electric field generates negative frequency chirp, and selectively generates positive frequency chirp in response to adjustment of the control electric field. As an alternative, the length differential between respective arms can be selected to generate a phase difference of $\pi/2$, in which case control electrodes are required on each of the interferometric arms. A method of selectively generating a modulated optical signal having selectively configurable frequency chirp is also described.

10 Claims, 6 Drawing Sheets

FIG. 4A  Good ER, and Maximized +ve Chirp

FIG. 4B  Good ER, and Maximized -ve Chirp

A π/2-Shifed MZ Modulator ($L_1-L_0=0.12$) with 2 Extra Pins $V_{c0}=$, or $V_{c1}=V_{2\pi}$

P1=[2.2, 2.6]P0

Good ER and small +ve or zero Chirp

Good ER and small -ve Chirp

FIG. 9B

CONFIGURABLE CHIRP MACH-ZEHNDER OPTICAL MODULATOR

FIELD OF THE INVENTION

This invention relates to a multi-quantum-well Mach-Zehnder phase modulator with a built-in phase shift and more particularly to such a device having separate control means for generating a modulated optical signal having either positive or negative frequency chirp with a high extinction ratio for high quality transmission over either dispersion shifted fiber or non-dispersion shifter fiber.

BACKGROUND OF THE INVENTION

The ever increasing demand for higher transmission capacity in communication networks at competitive costs requires optimum utilization of optical fiber transmission links. One consequence has been the adoption of multiple wavelengths between 1.52 µm and 1.56 µm in order to take advantage of a lower fiber loss and the bandwidth capacity of Erbium doped fiber amplifiers (EDFA). Unfortunately, chromatic dispersion of conventional single mode fibers is higher in this EDFA bandwidth than at the previously used wavelength of 1.31 µm. This dispersion originates from a frequency dependent group velocity and is typically 17ps/nm•km for non-dispersion shifted single mode fiber at a wavelength of 1.55 µm and −3.75 ps/nm•km for dispersion shifted single mode fiber at a wavelength of 1.53 µm.

Semiconductor lasers and particularly lasers fabricated from selected III-V compounds such as InGaAsP/InP can be tailored to generate an optical signal at the appropriate wavelength. Modulated lasers, however, have spectral broadening due in part to a wavelength shift or chirp brought about by the modulation. The pulse broadening is a result of a wavelength shift to shorter wavelengths (blue shift) at the rising edge of a modulating pulse and a wavelength shift to longer wavelengths (red shift) at the falling edge of the pulse. This is known as positive frequency chirp. Propagating through a non-dispersion shifted fiber, a pulse with positive frequency chirp is broadened because the rising edge moves faster and the falling edge moves slower. This frequency chirp can be quite large for directly modulated lasers and, as a result, the span between repeaters in an optical fiber network operating at high speed and utilizing such devices as transmitters is necessarily low.

Using current technology, directly modulated 1.55 µm lasers having multi-quantum-wells are capable of transmitting data rates of 2.5 Gb/s with a repeater span of 80 km. The dispersion penalty at this wavelength, however, is too large for practical long haul transmission via either a non-dispersion shifted fiber or a dispersion shifted fiber at 10 Gb/s.

An alternative to directly modulated lasers is an electro-optical modulator which, in conjunction with a C.W. operated laser, offers the promise of a modulated signal with controllable chirp.

An electro-optical modulator of particular interest is the Mach-Zehnder phase modulator operating as an interferometer. Prior art Mach-Zehnder modulators are commonly fabricated in lithium niobate ($LiNbO_3$) with titanium (Ti) diffused waveguides. The frequency chirp characteristics of such devices have been studied and reported in the literature. Okiyama et al ("10 Gb/s Transmission in Large Dispersion Fiber Using Ti:$LiNbO_3$ Mach-Zehnder Modulator", Conf. Integrated Optics and Optical Fiber Communication, Kobe, Japan, 1989), reported that Mach-Zehnder modulators could modulate a CW laser at bit rates up to 10 Gb/s although frequency chirp was noted.

Korotky et al ("High Speed Low Power Optical Modulator with Adjustable Chirp Parameters", Topical Meeting of Integrated Photonics Research, Monterey, Calif., 1991) reported that the chirp of a $LiNbO_3$ modulator could be controlled by tailoring the modulation voltage supplied to the electrodes. Korotky et al found that the modulator could be rendered essentially "chirpless" although such a condition was not necessarily ideal and that some pre-chirp might be advantageous for high speed, long haul transmission.

Gnauck et al ("Dispersion Penalty Reduction Using an Optical Modulator with Adjustable Chirp", Photonics Tech. Lett., Vol. 3, pp. 916–918, 1991) describe a Ti:$LiNbO_3$ Mach-Zehnder modulator which can be operated "chirpless" or with negative chirp. It is reported that slightly negative values of frequency chirp could be used to reduce pulse broadening and hence lower the dispersion penalty for transmission over non-dispersion shifted fiber.

More recently Mach-Zehnder modulators have been fabricated in III-V material such as InP with multi-quantum-wells of InP/InGaAsP in the guided regions. Such a device is described by Rolland et al ("10 Gb/s 120 km Normal Fiber Transmission Experiment Using a 1.56 µm Multi-Quantum-Well InP/InGaAsP Mach-Zehnder Modulator", Conf. Optical Fiber Communication, San Jose, Calif. 1993) in which some frequency chirp regulation is possible.

A Mach-Zehnder phase modulator is based on an interferometric configuration which converts phase modulation into intensity modulation. When the differential phase shift between the two arms of the modulator equals $\pm\pi$, the antisymmetric mode is excited near the output and is subsequently diffracted out of the single mode waveguide. This is the 'off' or logic '0' state. With no differential phase shift, the fundamental mode is excited and propagates with little loss to the output. This is the 'on' or logic '1' state. The ability to control the frequency chirp of Mach-Zehnder modulators by varying the drive voltage to the arms or by a power splitting ratio has made them well suited for multi-gigabit long distance optical fiber transmission.

The drive voltage which controls the differential phase shift is conventionally supplied to one arm (single arm drive) or to both arms (dual arm drive). This relationship will be discussed in greater detail later. In any event single arm drive conditions require a larger operating voltage than dual arm drive, while the dual arm driven with equal push-pull voltage for a $LiNbO_3$ modulator gives substantially zero chirp.

One significant difference between a III-V Mach-Zehnder modulator and a $LiNbO_3$ Mach-Zehnder is that in the former, absorption increases with voltage applied to the arms while absorption is not present in the latter. The amount of absorption in the III-V device depends on how close the operating wavelength is to the exciton peak of the multi-quantum-well material. Another difference between a $LiNbO_3$ Mach-Zehnder and a III-V device having a MQW is that the latter shows a non-linear phase change as a function of bias voltage. The non-linear phase change is used to advantage in the present invention, while the disadvantage of absorption is minimized.

Because the Mach-Zehnder modulator converts phase modulation into intensity modulation it is important that the ratio between the 'on' state and 'off' state is relatively high. This ratio, also known as the extinction ratio (ER), is a measure of the signal intensity against background noise. Consequently, a high extinction ratio also permits a greater span between repeaters in a transmission network.

As indicated previously, positive frequency chirp adversely affects long haul transmission over non-dispersion shifted fiber. In such situations, controlled levels of negative chirp provided by the optical modulator is advantageous. Some transmission networks make use of dispersion shifted or dispersion compensating optical fibers in which case negative chirp is not required and in fact it may be more appropriate to provide the data pulses with a slight positive chirp. There is, therefore, a requirement for an optical modulator capable of selectively providing both positive and negative chirp.

In co-pending U.S. application Ser. No. 08/612,555 filed on Mar. 8, 1996, a multi-quantum-well Mach-Zehnder optical modulator having different optical lengths between respective paths is described. The disclosure of the 08/612,555 application is incorporated herein by reference. In the prior application the optical paths have a length differential equal to $\pi$ or an integral odd multiple thereof at the selected operating free space wavelength. This differential in optical path length means that the interferometer is in the "off" or logic "0" state in the absence of electric field and "on" or logic "1" with electric field applied. This results in negative chirp with a good extinction ratio, as discussed more fully in the aforementioned application.

As indicated previously, negative chirp is advantageous for data transmission over non-dispersion-shifted optical fibre. The amount of negative chirp applied is, of course, important as too much will also have adverse affects on the pulse train.

The present invention utilizes the phase shift by optical path length as described in the prior application and adds to it means to further adjust the phase by an electric field, whereby a configurable chirp is obtained.

SUMMARY OF THE INVENTION

It is therefore an object of the present invention to provide a multi-quantum-well (MQW) Mach-Zehnder (MZ) optical modulator which can selectively generate either positive or negative frequency chirp.

It is also an object of the present invention to provide an MQW MZ which generates either positive or negative chirp with only a single additional control electrode.

It is a further object of the invention to provide a MQW MZ which generates continuously adjustable frequency chirp from negative chirp to positive chirp with two additional electrodes.

Therefore in accordance with a first aspect of the present invention there is provided a multi-quantum-well Mach-Zehnder phase modulator for selectively generating positive and negative frequency chirp in an optical signal of a known free-space wavelength. The modulator comprises an asymmetric input y-junction waveguide coupler having an input waveguide for receiving the optical signal, as well as first and second input branch waveguides and an asymmetric output y-junction waveguide coupler having an output waveguide for delivering the modulated optical signal and first and second output branch waveguides. The modulator also has a first interferometric arm between first branch waveguides of the input and output y-junction couplers defining a first optical path and a second interferometric arm between second branch waveguides of the input and output y-junction couplers defining a second optical path, one of the path lengths being greater than the other by a distance which generates a fixed phase difference of $\pi$ at the known wavelength. Electrodes are provided on the first and second interferometric arms for applying an electric field to modulate the effective phase difference between the arms. A control electrode is provided on one of the arms for selectively applying a control electric field to selectively modulate the phase difference between the arms. With no electric field on the control electrode a negative frequency chirp is generated and with a control electric field on the arm equal to the field required to generate the fixed phase difference a positive frequency chirp is generated.

In a preferred embodiment of this aspect the fixed phase difference is $\pi$ or an integral odd multiple thereof.

In a second aspect of the invention the fixed phase difference generated by the differential in length between the two interferometric arms is $\pi/2$. In this embodiment a control electrode is provided on each of the interferometric arms for receiving a control electric field. The control field is such that a further phase difference of $\pi/2$ is selectively applied to one or other interferometric arms resulting in either no phase difference or a selective phase difference of $\pi$. Thus either positive or negative frequency chirp is generated depending on which arm is supplied with the control electric field.

In accordance with a further aspect of the invention there is provided a method of selectively generating positive and negative frequency chirp in an optical signal of known free-space wavelength comprising the steps of: (a) coupling the optical signal to a multi-quantum-well Mach-Zehnder phase modulator having an asymmetric input y-junction coupler and an asymmetric output y-junction coupler with first and second interferometric arms therebetween defining first and second optical paths, one of the paths being longer than the other by a length which generates a fixed phase difference of $\pi$ at the known wavelength; first and second electrodes on respective arms for receiving a biasing and modulating electric field in order to adjust the effective phase differential between the respective arms, and a control electrode on one of the arms; (b) supplying an electric field to each of the first and second electrodes in an equal push-pull relationship, the magnitude of the electric field being selected to produce a phase difference of $\pi$; and (c) selectively supplying an electric field to the control electrode such that a negative frequency chirp is generated with an electric field of zero and positive frequency chirp is generated with an electric field equal to the bias and modulating field required to produce a phase difference of $\pi$.

In yet a further aspect of the invention the phase difference created by the length differential between the interferometric arms is selected to be $\pi/2$. In this aspect each of the arms has a control electrode and a control electric field equal to the field required to generate an effective phase difference of $\pi/2$ is selectively applied to each arm whereby a control electric field to one arm generates a negative frequency chirp and a control electric field to the other arm generates a positive frequency chirp.

Selectively adjusting the control field to respective arms can result in continual frequency chirp adjustment from positive to negative thereby producing a fully configurable chirp modulator.

BRIEF DESCRIPTION OF THE DRAWINGS

The invention will now be described in greater detail with reference to the attached drawings wherein.

DETAILED DESCRIPTION OF THE INVENTION

A highly desirable feature of an external light modulator is the ability to generate a signal with an adjustable frequency chirp. Mach-Zehnder (MZ) III-V multi-quantum-well (MQW) modulators are thus increasingly attractive relative to other modulator designs because of their adjustable frequency chirp, low drive voltage, small size, long term reliability and potential for integration with laser sources. Unfortunately, in III-V MQW MZ modulators where the two arms of the interferometer are of equal length with a power splitting ratio of 50%, the non-linear electro-optic effect imparts a small positive chirp under symmetric push-pull operation. While negative chirp can be induced by designing the y-junction to inject less optical power into the more deeply biased modulator arm and employing a small amount of overdrive, the back-to-back extinction ratio is degraded. This is described in greater detail in co-pending U.S. patent application Ser. No. 08/450,841 filed May 25, 1995, by Rolland et al, the contents of which are incorporated herein by reference.

U.S. patent application Ser. No. 08/612,555 to Yu et al filed on Mar. 8, 1996, considers an InP/InGaAsP MQW Mach-Zehnder modulator with a structure substantially identical to that discussed in U.S. Ser. No. 08/450,841 except that the optical path through one modulator arm is elongated to produce the required relative π phase shift at the λ=1.56 μm operating wavelength. This additional waveguide length is given in terms of the modal refractive index $n_{eff}$ by $$\frac{\lambda}{2n_{eff}} = \frac{1.56}{2 \times 3.23} \mu m = 0.241 \mu m$$

Correspondingly, a π/2 phase shifted MZ at the λ=1.56 μm requires that the additional length in one arm be 0.12 μm.

In a semiconductor phase modulator the larger phase change in a push-pull configuration occurs in the more deeply DC-biased arm because of the non-linear nature of the quantum confined Stark effect. Further, for a single-mode waveguide, the total optical field at the output of the modulator can be regarded to a first approximation as a weighted summation of the optical field from the two separate arms. The weight factors depend on the power splitting ratio of the two y-junctions and the photo-absorption in the modulation section.

Figure 1A:
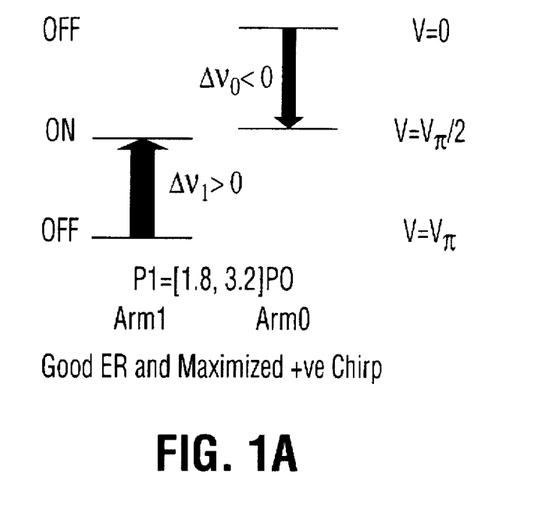
FIG. 1A illustrates graphically the relationship of the bias voltage to each arm of a conventional MQW Mach-Zehnder phase modulator with appropriate optical power ratios between the two interfermotric arms in order to generate positive chirp.

FIG. 1A illustrates the push-pull drive conditions for obtaining positive chirp in a conventional (i.e., equal arm lengths) III-V MQW MZ modulator. The device, driven in a push-pull configuration, is switched from an "off" to an "on" state. The device reaches the "on" or "push" state when both arms are biased equally at V=Vπ/2. The phase of the optical field in Arm 1 is thus decreased when the device is switched from an "off" to "on" state so that the change in frequency $\Delta v_1 > 0$ and consequently the optical field is blue-shifted. By the same reasoning $\Delta v_0 < 0$ and the optical field is red-shifted in Arm 0. For equal voltage push-pull operation, $|\Delta v_1| > |\Delta v_2|$ as a result of the non-linearity of the electro-optic effect. In order to compensate for the larger photo-absorption in Arm 1 which is more deeply biased the Y-junction splits more power into Arm 1, which not only increases the extinction ratio but also maximizes the blue-shift in the rising edge of the optical pulse.

Figure 1B:
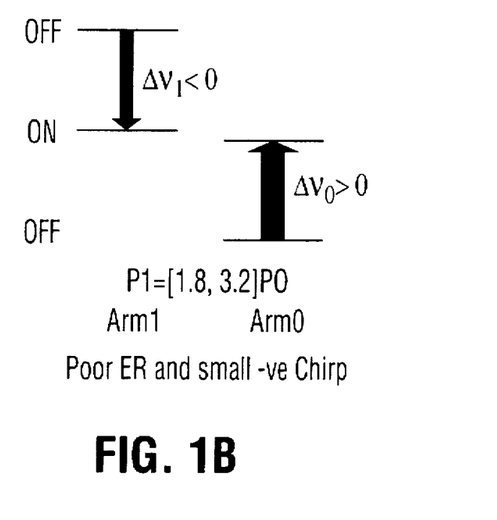
FIG. 1B illustrates the push-pull modulation and bias voltage relationship for the modulator of FIG. 1A to generate negative chirp.

FIG. 1B illustrates the bias voltage relationship in the situation in which Arm 1 has the greater optical power but is biased from 0 to Vπ/2. This does generate negative chirp albeit of poor quality. Further, the extinction ratio is also low.

Figure 2A:
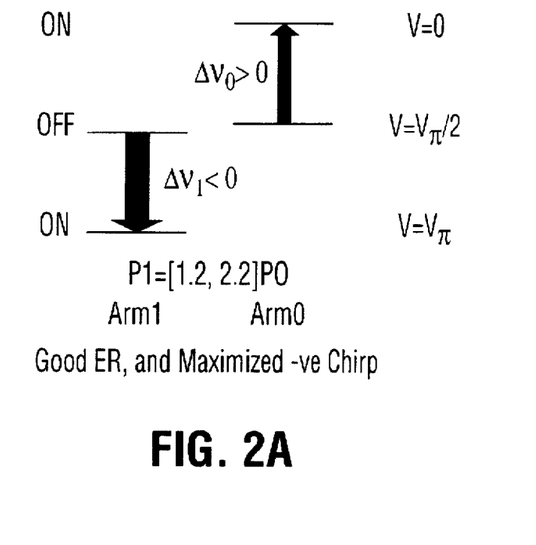
FIG. 2A illustrates graphically the push-pull modulation and bias voltage relationship required to generate negative chirp in a MZ modulator having a π phase shift introduced by a differential in arm length.

FIG. 2A illustrates the relationship for both arms of a π phase shifted III-V MQW MZ modulator as described in the aforementioned 08/612,555 application. The device is switched on when both arms reach the pull-state. The phase of the optical field in Arm 1 is thus decreased when the device is switched from the "off" to "on" state so that $\Delta v_1 < 0$, red-shifting the optical field in Arm 1. At the same time, $\Delta v_2 > 0$ and the optical field is blue-shifted in Arm 2. Since now $|\Delta v_1| > |\Delta v_2|$, again as a result of the non-linearity of the electro-optic effect, the rising edge of the optical pulse is red-shifted. Although such a π phase shifted modulator has a theoretically infinite extinction ratio for a symmetric y-junction, in practice, to obtain sufficient negative frequency chirp, slightly more power must be directed into Arm 1. This small asymmetry does not however significantly affect the extinction ratio. As illustrated in FIG. 2A the optical power in Arm 1 is in the range 1.2 to 2.2 times the optical power in Arm 0. This asymmetrical power splitting can be achieved by designing asymmetric input and output y-junction waveguide couplers.

Figure 2B:
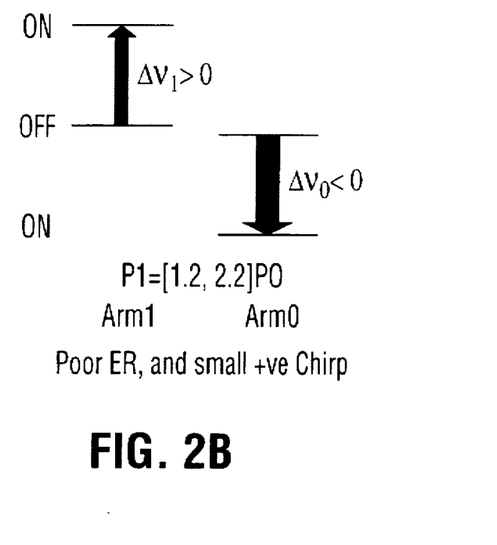
FIG. 2B illustrates the push-pull modulation and bias voltage conditions required to generate positive chirp in the modulator of FIG. 2A.

FIG. 2B shows the push-pull drive conditions necessary to obtain positive chirp with a π phase shifted MZ modulator. In this configuration the arm with the greater optical power—Arm 1, is driven from V=Vπ/2 to 0 while Arm 0 is driven from Vπ/2 to Vπ. Although this could still give a good extinction ratio, the positive chirp is small.

In summary, FIG. 1A shows good positive chirp and a good extinction ratio while FIG. 2A shows good negative chirp and a good extinction ratio. The present invention obtains both of these results in a single modulator.

Figure 3:
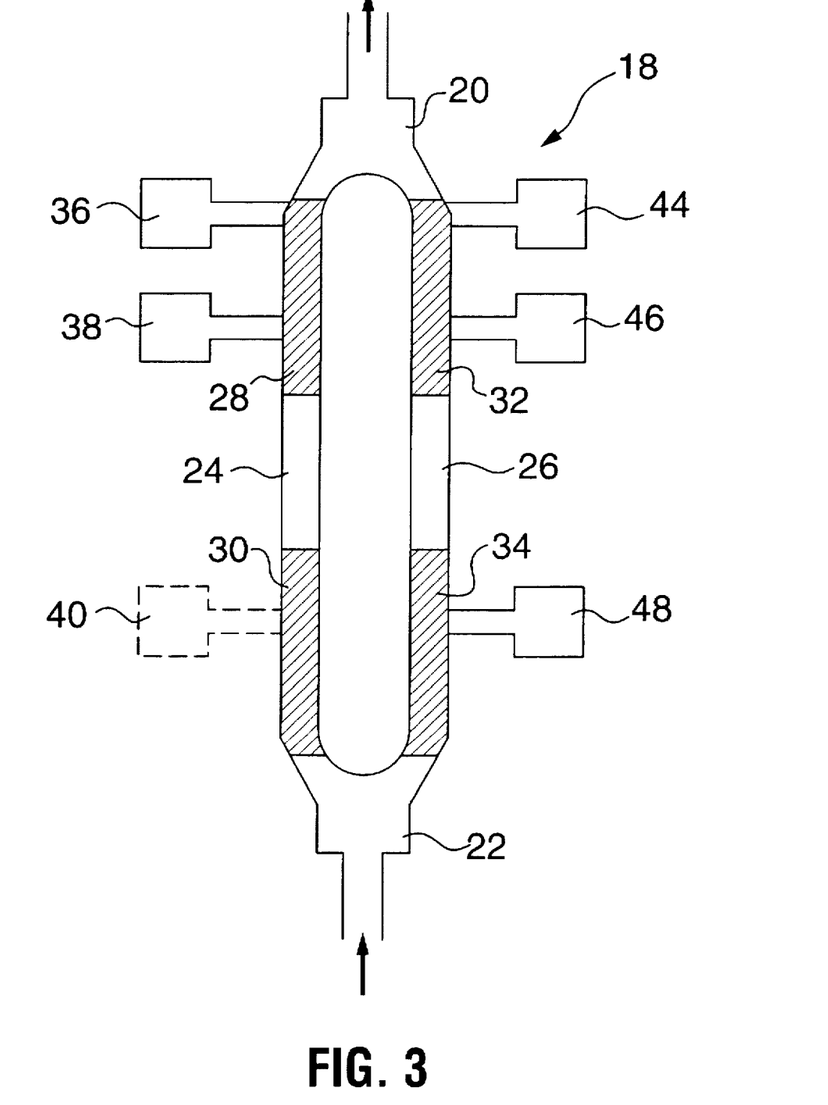
FIG. 3 is a plan view of the MZ interferometer according to the present invention.

A first aspect of the present invention will now be described with reference to FIG. 3 and FIGS. 4A and 4B. FIG. 3 is a simplified plan drawing of the structure of the Mach-Zehnder modulator. The device is formed in III–V material such as InP/InGaAsP having multi-quantum-wells. For a description of the material composition, reference may be made to prior U.S. application Ser. No. 08/612,555 identified herein. Although not readily apparent from FIG. 3, it is to be understood that the optical path length through arm 1 of the interferometer is longer than the path length through arm 0 by the distance equivalent to π or an integral odd multiple thereof at the operating free space wavelength of the device. For example, for an operating wavelength of 1.56 μm, the optical path through arm 1 is 0.24 μm longer than through arm 0 for a π phase shift. As shown in FIG. 3, the modulator structure 18 includes asymmetric input y-junction waveguide 22 and asymmetric output y-junction waveguide 20. Branch arms 24,26 are optically parallel and join the y-junction couplers as shown.

Each branch arm 24,26 has two separated contact pads 28,30 and 32,34 respectively. Pads 28, 32 have bonding zones 36,38, and 44,46 respectively for connection to power sources and impedance termination as is well known in the art. For the configuration of FIG. 3, bias and modulation voltage in push-pull mode is supplied to pads 28,32 while pad 34 is for supplying control voltage as better shown in FIGS. 4A and 4B.

Figure 4A:
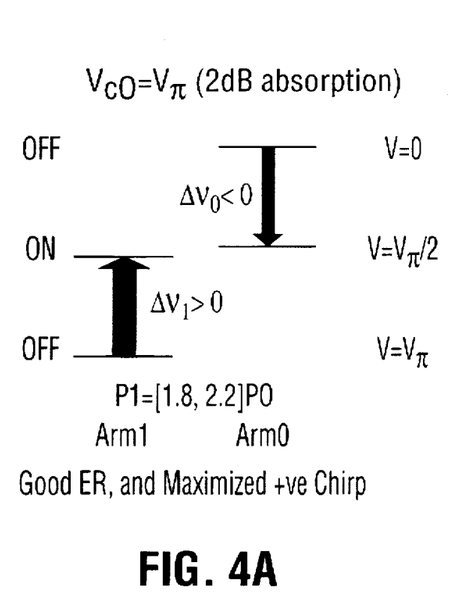
FIG. 4A illustrates the push-pull modulation and bias voltage and control voltage relationship for positive chirp in a MZ modulator having a built-in π phase shift.
Figure 4B:
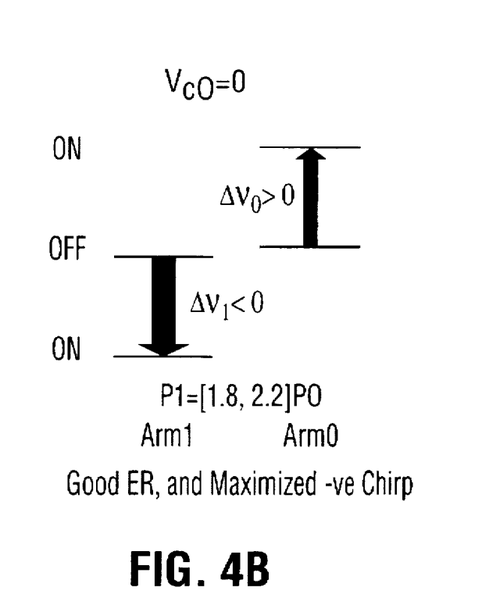
FIG. 4B illustrates graphically the push-pull modulation and bias voltage and control voltage relationship for generating negative chirp in the modulator of FIG. 4A.

In FIGS. 4A and 4B, Arm 1 is provided with more optical power such that the Arm 1 optical power P1=[1.8, 2.2] P0, P0 being the optical power in Arm 0. It will be noted that FIGS. 4B shows the same relationship as that shown in FIG. 2A for good extinction ratio (ER) and good negative chirp.

The conditions shown in FIG. 4A can be equated to the conditions set out in FIG. 1A for good ER and good positive chirp. In FIG. 4A a control voltage equal to Vπ is supplied to the control voltage pad 34 on Arm 0 via electrode 48. This control voltage effectively offsets the phase differential established by the optical path length differential. The control voltage Vπ on Arm 0 introduces, typically, less than 2 dB absorption which may require further amplification in the system to offset about 0.6 dB extra insertion loss.

Figure 5:
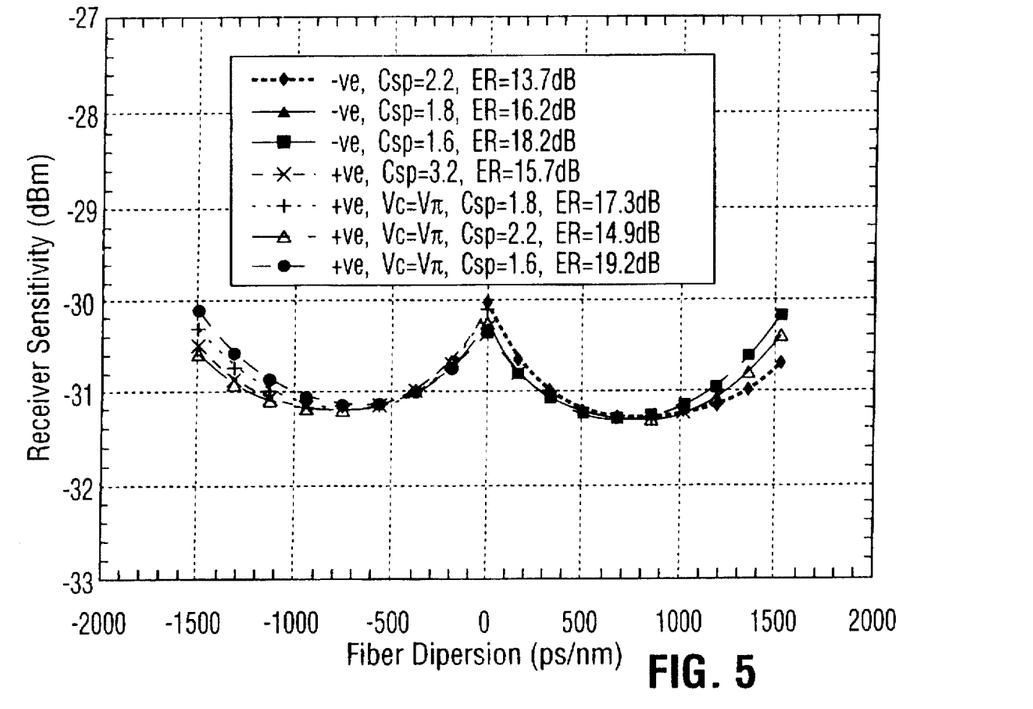
FIG. 5 is a simulation of receiver sensitivity vs. fiber dispersion for different optical power splitting ratios and comparison with individual positive or negative chirp devices.

FIG. 5 is a graph showing sensitivity as a function of fiber dispersion for different optical power ratios. The values wherein no control voltage (VC) is listed are for reference devices. The graphs including VC are for a π shifted device having Vπ control voltage supplied to pad 34 via electrode 48, as shown in FIG. 3, to provide good positive chirp. It can be seen that the configurable chirp MZ of the present invention can achieve the same transmission performance as two individual modulators.

Figure 6:
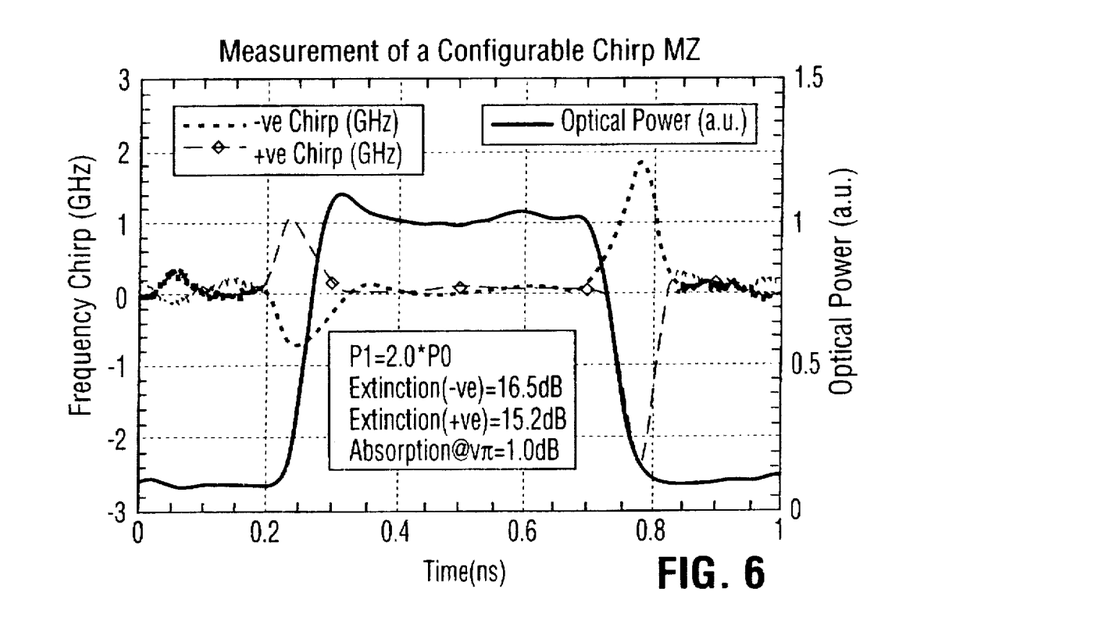
FIG. 6 is a measurement of frequency chirp for a modulator of a π-shifted, configurable chirp MZ modulator.

FIG. 6 is a measurement of frequency chirp for a modulator of a π-shifted configurable chirp Mach-Zehnder modulator according to the present invention.

Figure 7A:
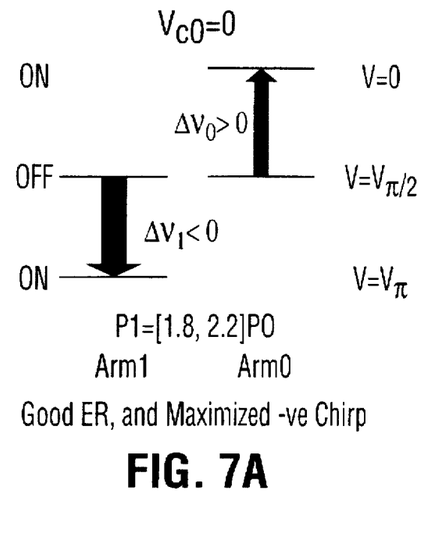
FIG. 7A illustrates graphically the push-pull modulation and bias voltage and control voltage for generating maximized negative chirp in a π shifted MZ modulator.
Figure 7B:
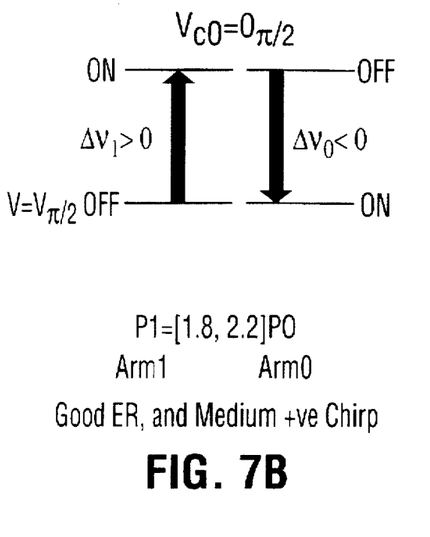
FIG. 7B illustrates graphically the relationship utilizing a π/2 control voltage for generating a medium amount of positive chirp in a π shifted MZ modulator.
Figure 8A:
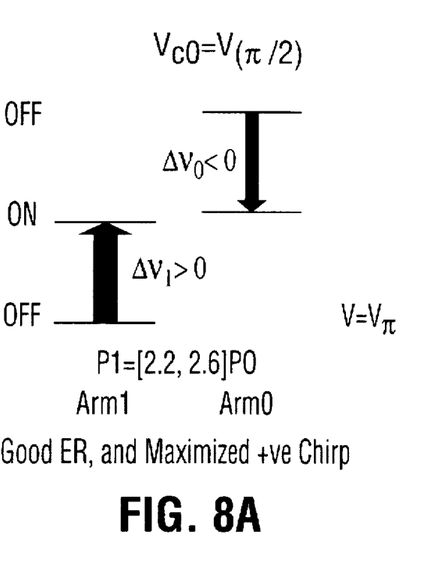
FIG. 8A illustrates graphically the push-pull modulation and bias voltage and control voltage relationship for generating maximized positive chirp in a π/2 phase shifted MZ modulator.
Figure 8B:
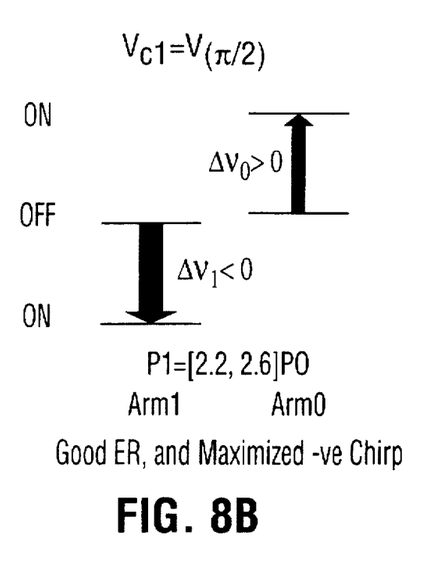
FIG. 8B illustrates graphically the push-pull modulation and bias voltage and control voltage relationship for generating maximized negative chirp in the modulator of FIG. 8A.

FIGS. 7A and 7B illustrate a second embodiment of the present invention. In this case, as shown in FIG. 7A, no control voltage is supplied to the control pad and consequently the device behaves the same as that shown in FIG. 4B. In FIG. 7B, however, a control voltage of V(π/2) is supplied to the control pad on Arm 0. This effectively raises the voltage on Arm 0 so that it is biased between 0 and V(π/2), the same as Arm 1. This embodiment provides good extinction ratio and positive chirp which is not as good as provided by the embodiment of FIG. 4A. The advantage of the embodiment of FIG. 7B is that there is slightly less insertion loss than that for FIG. 4A A third embodiment is illustrated in FIGS. 8A and 8B. In this instance the difference in optical path length between Arm 1 and Arm 0 is only π/2 which, for an operating wavelength of 1.56 μm is 0.12 μm. In this embodiment the interferometer is provided with control voltage pads 30 and 34 on each arm as shown in FIG. 3. The electric field is supplied to pad 30 via electrode 40 shown in broken line in FIG. 3. It is to be understood that for a π-shifted modulator a control electrode is required on just one arm (arm 0 in FIG. 3) whereas a π2 shifted device requires a control electrode on each arm. The control voltage is tuned to create the effective phase differential as previously discussed. Thus, for positive chirp, Arm 0 is supplied with a control voltage of V(π/2) while no voltage is supplied to Arm 1. For negative chirp, Arm 1 is driven with a control voltage of π/2 and no voltage is supplied to Arm 0. In the positive chirp case the control voltage equivalent to a π/2 phase shift counteracts the phase differential. In the negative chirp condition the control voltage equivalent to π/2 phase shift adds to the π/2 phase difference introduced by the length differential to equal a π phase shift.

Figure 9A:
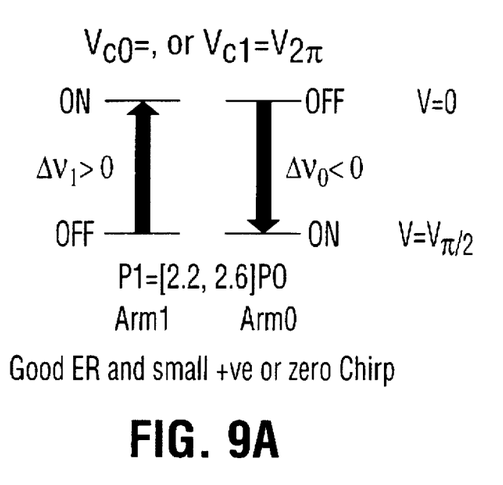
FIGS. 9A and 9B illustrate graphically the push-pull modulation and bias voltage and control voltage relationship for generating continuously variable chirp in a π/2 phase shifted MZ modulator
Figure 9B:
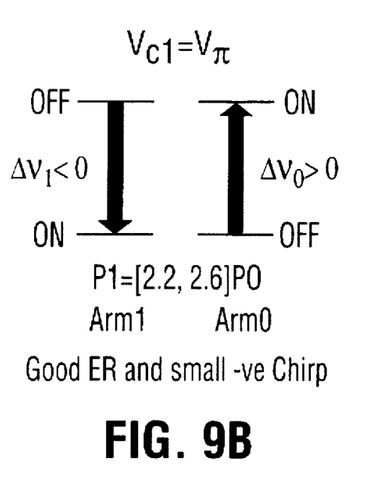

In order to have an adjustable amount of chirp, such as less positive chirp than the modulator of FIG. 8A it is only necessary to decrease the control voltage at Arm 0 and decrease the bias voltage in Arm 1 until the modulator is driven as shown in FIG. 9A. Similarly, a π/2 shifted modulator driven as shown in FIG. 9B has less negative chirp than the modulator driven as shown in FIG. 8B.

As a variation on the π/2 shifted modulator structure, it is also possible to obtain both positive and negative chirp by using both forward and reverse biased control voltage supplied to only one pad on the interferometer.

Although specific embodiments of the invention have been illustrated and described it will be apparent to one skilled in the art that numerous variations and alternatives can be implemented. It is intended that the scope of the invention will only be limited by the appended claims.

I claim:

1. A multi-quantum-well Mach-Zehnder phase modulator for selectively generating positive and negative frequency chirp in an optical signal of a known free space wavelength comprising:

an asymmetrical input y-junction waveguide coupler having an input waveguide for receiving said optical signal and first and second input branch waveguides;

an asymmetric output y-junction waveguide coupler having an output waveguide for delivering said modulated optical signal and first and second output branch waveguides;

a first interferometric arm between first branch waveguides of said input and output y-junction couplers defining a first optical path;

a second interferometric arm between second branch waveguide of said input and output y-junction couplers defining a second optical path, one of said path lengths being greater than the other by a distance which generates a fixed phase difference of π at the known wavelength;

electrode means on said first and second interferometric arms for applying an electric field to modulate the effective phase difference between said arms; and control electrode means on one of said first and second arms for selectively applying a control electric field to said one arm to selectively modulate the phase difference between said arms, whereby with no electric field on said control electrode a negative frequency chirp is generated and with a control electric field on said one arm equal to the voltage required to generate said fixed phase difference a positive frequency chirp is generated.

2. A multi-quantum-well Mach-Zehnder phase modulator as defined in claim 1 having a fixed phase difference of an integral odd multiple of $\pi$.

3. A multi-quantum-well Mach-Zehnder phase modulator as defined in claim 2 wherein the asymmetrical input y-junction coupler splits the optical signal entering the modulator such that more optical power is supplied to the interferometric arm in the longer optical path.

4. A multi-quantum-well Mach-Zehnder phase modulator as defined in claim 3 wherein the ratio of the optical splitting is in the range 1:1.8 to 1:2.2 depending on the electro-absorption of the multi-quantum-well.

5. A multi-quantum-well Mach-Zehnder phase modulator as defined in claim 4 wherein the control electrode is on the interferometric arm to which the lower optical power is supplied.

6. A multi-quantum-well Mach-Zehnder phase modulator for selectively generating positive and negative frequency chirp in an optical signal of a known free space wavelength comprising:

an asymmetrical input y-junction waveguide coupler having an input waveguide for receiving said optical signal and first and second input branch waveguides control voltage;

an asymmetrical output y-junction waveguide coupler having an output waveguide for delivering said modulated optical signal and first and second output branch waveguides;

a first interferometric arm between first branch waveguides of said input and output y-junction couplers defining a first optical path;

a second interferometric arm between second branch waveguides of said input and output y-junction couplers defining a second optical path, one of said path lengths being greater than the other by a distance which generates a fixed phase difference of $\pi/2$ at the known wavelength;

electrode means on said first and second interferometric arms for applying an electric field to modulate the effective phase difference between said arms; and control electrode means on each of said first and second arms for selectively applying control electric fields to each of said arms to selectively modulate the phase difference between said arms, whereby an electric field equal to $\pi/2$ applied to said control electrode on the first arm in the absence of any field to the electrode on second arm results in positive frequency chirp while an equal electric field applied to the control electrode on the second arm in the absence of any field to the electrode on the first arm results in negative frequency chirp.

7. A multi-quantum-well Mach-Zehnder phase modulator as defined in claim 6 wherein the asymmetrical input y-junction coupler splits the optical signal entering the modulator such that a greater portion of the optical power is supplied to the interferometric arm in the longer optical path.

8. A multi-quantum-well Mach-Zehnder phase modulator as defined in claim 7 wherein the splitting ratio of optical power is in the range 1:2.2 to 1:2.6 depending on the electro-absorption of the multi-quantum-well.

9. A method of selectively generating positive and negative frequency chirp in an optical signal of known free-space wavelength comprising the steps of:

(a) coupling said optical signal to a multi-quantum-well Mach-Zehnder phase modulator having an asymmetric input y-junction coupler and an asymmetric output y-junction coupler with first and second interferometric arms therebetween defining first and second optical paths, one of which being longer than the other by a length which generates a fixed phase difference of $\pi$ at said known wavelength; first and second electrodes on respective arms for receiving a modulating electric field in order to adjust their effective phase difference; and a control electrode on one of said interferometric arms;

(b) supplying an electric field to each of said first and second electrodes in an equal push-pull relationship, the amplitude of said electric field being selected to produce said fixed phase difference; and (c) selectively supplying an electric field to said control electrode whereby a negative frequency chirp is generated with no electric field and positive frequency chirp is generated with an electric field equal to said electric field required to produce said fixed phase difference.

10. A method of selectively generating positive and negative frequency chirp in an optical signal of known free-space wavelength comprising the steps of:

(a) coupling said optical signal to a multi-quantum-well Mach-Zehnder phase modulator having an asymmetrical input y-junction coupler and an asymmetric output y-junction coupler with first and second interferometric arms therebetween defining first and second optical paths, one of which being longer than the other by a length which generates a fixed phase difference of $\pi/2$ at said known wavelength; first and second modulating electrodes on respective arms for receiving a modulating electric field in order to adjust the effective phase difference of said arms; and first and second control electrodes on respective arms;

(b) supplying an electric field to each of said first and second modulating electrodes in an equal push-pull relationship, the amplitude of said electric field being selected to produce said fixed phase difference; and (c) selectively applying an electric field to one or the other of said control electrodes, whereby a field to one control electrodes results in positive frequency chirp and a field to the other control electrode results in negative frequency chirp.

* * * * *

UNITED STATES PATENT AND TRADEMARK OFFICE
CERTIFICATE OF CORRECTION

PATENT NO. : 5,778,113
DATED : July 7, 1998
INVENTOR(S) : Jun YU

It is certified that error appears in the above-indentified patent and that said Letters Patent is hereby corrected as shown below:

Col. 9   line 32   Delete "control"
Col. 9   line 33   Delete "voltage"

Signed and Sealed this

Fourth Day of July, 2000

Attest:

Attesting Officer

Q. TODD DICKINSON

Director of Patents and Trademarks